Patented Aug. 18, 1925.

1,549,865

UNITED STATES PATENT OFFICE.

JULIUS HOWELLS GILLIS, OF SUDBURY, ONTARIO, CANADA, ASSIGNOR OF ONE-HALF TO THOMAS ROBINSON, OF NEW YORK, N. Y.

METHOD OF TREATING IRON ORE.

No Drawing. Application filed October 24, 1921. Serial No. 510,094.

*To all whom it may concern:*

Be it known that I, JULIUS HOWELLS GILLIS, a citizen of the United States of America, and resident of the town of Sudbury, in the Province of Ontario and Dominion of Canada, have invented certain new and useful Improvements in Methods of Treating Iron Ore, of which the following is a specification.

This invention relates to improvements in methods of treating iron ore, and the objects of the invention are to provide a simple and effective method for eliminating the sulphur contents of the ore at low operative cost.

The elimination of sulphur from iron ore is a problem which has occupied the attention of metallurgists for many years. It is most frequently eliminated by roasting the ore before treatment in an open hearth furnace, but it is difficult by this method to completely remove the sulphur to the extent necessary for the production of high grade iron and steel.

According to the present invention the iron ore is fused without roasting and the sulphur eliminated by blowing air through the molten bath to oxidize the sulphur and other impurities; after which the iron oxides are reduced to pig iron or steel in an electric furnace, open hearth furnace or by any of the well-known methods practised in the art.

Most iron ores consist of a mixture of silica and iron oxides which can be fused in a furnace and made to form a slag. The composition of this slag may vary within wide limits. Slags containing as high as sixty-two (62%) percent silica and as low as ten (10%) percent silica have often been made. These slags can be made in different types of furnaces and require only from ten (10%) to fifteen (15%) per cent of the fuel required in an ordinary iron blast furnace.

In practically carrying out the process the ore is melted in a blast or other suitable furnace and, when the slag is formed and before any oxides have been reduced, air or other oxidizing agent is blown through the molten material in sufficient amount to eliminate the sulphur or other impurities. By this method the sulphur and other impurities can be easily and quickly eliminated to any desired extent. After the sulphur and other impurities have been eliminated, the iron oxides in the molten material can be reduced to pig iron or steel in an electric or open hearth furnace or any other well-known method of reducing pig iron or steel.

By this process it will be possible to make use of a large quantity of iron bearing slags which are now discarded owing to the expense of removing the small amount of sulphur which they contain. It will be possible to take these slags direct from the furnace in a molten condition and, after eliminating the sulphur, reduce the iron oxides to pig iron or steel in commercial form.

I am aware that it is well-known to eliminate sulphur by blowing air through a molten bath of material, but as far as I am aware it has not been proposed to completely oxidize a charge of molten iron ore before reduction has been started.

As many changes could be made in the above process and many apparently widely different embodiments of my invention within the scope of the claims, constructed without departing from the spirit or scope thereof, it is intended that all matter contained in the accompanying claims shall be interpreted as illustrative and not in a limiting sense.

What I claim as my invention is:

1. The herein described method of treating iron ore which comprises first treating the ore without roasting to form a slag and then subjecting it to an air blast to eliminate the sulphur and other impurities therefrom.

2. The herein described method of treating iron ore, which comprises first treating the same to form a slag, then oxidizing the charge to eliminate the impurities therein, and partially reducing the iron oxides by adding carbon and blowing with air, leaving sufficient iron oxide unreduced to flux the silica.

3. The herein described method of treating iron ore which comprises first treating it to form a slag, then subjecting the charge to an air blast whereby the sulphur and other impurities are eliminated, after which a part of the iron is reduced, sufficient being left to flux the silica.

4. The herein described method of treating iron ore which consists in first melting the same to form a slag, then subjecting the charge to an oxidizing agent to eliminate the impurities therein, and partially reducing the iron oxides by adding carbon and blowing with air, leaving sufficient iron oxide unreduced to flux the silica.

In witness whereof I have hereunto set my hand.

JULIUS HOWELLS GILLIS.